United States Patent [19]
Gerritsen

[11] 3,887,306
[45] June 3, 1975

[54] PERISTALTIC PUMP AND HOSE THEREFOR

[76] Inventor: Jan Willem Gerritsen, Raadhuisstraat 75 a,, Alphen a/d Rijn, Netherlands

[22] Filed: Jan. 29, 1974

[21] Appl. No.: 437,702

[30] Foreign Application Priority Data
Jan. 31, 1973 Netherlands.................... 7301380

[52] U.S. Cl. ................................................ 417/477
[51] Int. Cl. ... F04b 43/18; F04b 43/12; F04b 45/06
[58] Field of Search............................. 417/477, 476

[56] References Cited
UNITED STATES PATENTS

| | | | |
|---|---|---|---|
| 2,987,004 | 6/1961 | Murray | 417/477 |
| 3,176,622 | 4/1965 | Pfeiffer | 417/477 |
| 3,565,554 | 2/1971 | Muller | 417/477 |
| 3,787,148 | 1/1974 | Kopf | 417/477 |

Primary Examiner—William L. Freeh
Assistant Examiner—Richard E. Gluct
Attorney, Agent, or Firm—Weingarten, Maxham & Schurgin

[57] ABSTRACT

A peristaltic pump having a hose which includes two circumferentially narrow wall zones having embedded therein reinforcing threads extending in the longitudinal direction of the hose. These threads prevent the hose from being elongated due to the action of revolving thrust rollers which alternately engage the hose to squeeze the contents thereof through said hose.

8 Claims, 5 Drawing Figures

PERISTALTIC PUMP AND HOSE THEREFOR

This invention relates to a peristaltic pump.

Peristaltic pumps are well-known and comprise a hose on which a pumping action is exerted by thrust rollers mounted for rotation and adapted to orbit in a circular track around a central shaft, during which they locally squeeze the hose against an arcuate support track provided concentrically around part of the track orbited by the rollers.

Difficulties are encountered in particular if peristaltic is used for raising concrete, cement grout and like mixtures to a high level, even if the hose is reinforced with strong layers of steel wire wound helically so that the helices of the successive layers cross one another at the most favourable angle, i.e., about 108°. The only result of this reinforcement is that the hose is not substantially changed in diameter or length by the internal fluid pressure. In a peristaltic pump, however, in which the thrust rollers roll on the hose and squeeze it entirely shut, the hose is subjected to a severe tensile force which locally elongates the hose to a high percentage, sometimes about 50%.

The resulting elongation causes the wall of the hose to become thinner, owing to which the thrust rollers effect insufficient sealing within the hose when traversing their orbit. As a consequence sand and other sharp particles find their way in between the rubber layers, and, the rubber being under tension, the hose is rapidly damaged by such particles, which cut into the rubber wall.

Also, owing to the extreme elongation, the interior diameter of the hose is reduced, which decreases the pump's output and increases the risk of clogging.

It is an object of the present invention to provide a peristaltic pump in which the above and other disadvantages are eliminated.

According to the invention, there is provided a peristaltic pump comprising a plurality of thrust rollers mounted for rotation and movable in a circular orbit around a central shaft, an arcuate support track concentrically around part of said orbit, and a hose reinforced with threads of strong material, such as steel, said hose being arranged to be locally squeezed shut by said thrust rollers against said support track, characterized in that reinforcing threads extending in the longitudinal direction of the hose are embedded exclusively in two wall zones of said hose, said wall zones, as viewed in the cross-section of the hose, being located in a relatively small sector and symmetrically on opposite sides of the diameter perpendicular to said central shaft.

The term thread is used herein and in the appendant claims to denote filaments, yarns, cords or the like of strong material, such as steel.

The wall zones containing the reinforcing threads according to the present invention are preferably located on the same side of, and spaced equal distances from, the diameter parallel to the central shaft of the pump. In a preferred embodiment of the invention the longitudinally extending reinforcing threads are located on the side of the diameter parallel to said central shaft, which faces said central shaft, and another preferred feature is that the location of said wall zones corresponds to one third of the circumference of the hose, i.e. their corresponding radii to the axis of the hose enclose an angle of approximately 120° when the hose is in the cylindrical shape. The result is that, in spite of high pump pressures and attendant loads from the rollers, the hose is not elongated or twisted and yet retains the possibility of bending according to the track traversed by the rollers. During this blending and loading the neutral surface, in a common hose normally located in a diametrical plane, is displaced towards the wall zones containing the longitudinally extending reinforcing threads.

Furthermore, it is preferable that the longitudinally extending reinforcing threads are located in contact with the radially inward side of a layer of helically wound reinforcing threads, or between the crossing helices of radially successive layers. If they are located on the radially outward side of the helically wound reinforcing threads, the longitudinal threads would cause undue pressure of the rubber against the thrust roller.

Owing to the use of the hose according to the present invention in a peristaltic pump, it is no longer necessary to use driven rollers, as a consequence of which a simple pump construction is possible, while the safeguard against elongation of the hose opens up the possibility of lubricating the hose, for example, with glycerine in the pump housing, which at the same time serves for cooling the hose.

Advantageously, the shortest distance between the support track and the circumference of the thrust rollers, viewed in a sectional plane containing the axis of the central shaft, is shorter adjacent the axial ends of the rollers than adjacent their axial centre, which can be obtained by hollowing the surface of the thrust rollers or of the support track, or both co-acting surfaces.

By virtue of this arrangement, as the hose is compressed, the wall zones in which the sharp bends are to be formed are compressed first, so that the hose is closed simultaneously throughout its cross-section, or even first adjacent the sharp-bend zones, while it is also prevented that particles of the material to be pumped are forced from the centre to the sharp bends of the hose wall and are clamped therein.

Finally the invention provides for abrupt engagement of the thrust rollers on the hose at the run-on end of the support track.

Some embodiments of the invention will now be described, by way of example, with reference to the accompanying drawings, in which FIGS. 1 and 2 show longitudinal sections of two types of hoses suitable for use with a peristaltic pump according to the present invention;

Figure 1:
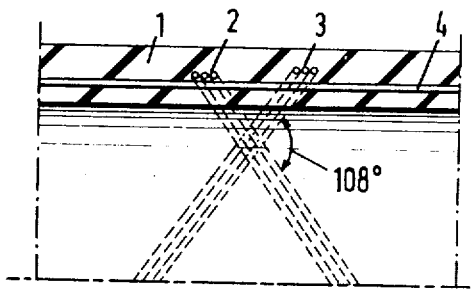

Referring to the drawings, FIG. 1 shows a longitudinal section of a pump hose. In rubber hose 1, helically wound, crossing reinforcing threads are located, forming layers 2 and 3. On the radially inward side of these layers 2 and 3 are provided longitudinally extending reinforcing threads 4. The threads of layers 2 and 3 cross one another at the most favourable angle for this kind of hoses, namely, about 108°.

Figure 2:
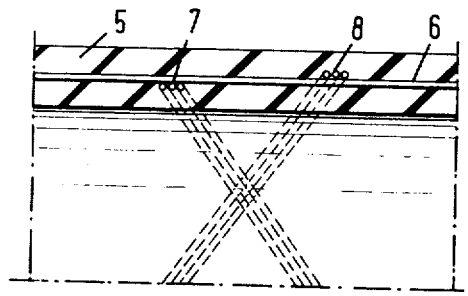

In hose 5 in FIG. 2, the longitudinal reinforcing threads 6 according to the invention are located between layers 7 and 8 of helically wound reinforcing threads.

Figure 3:
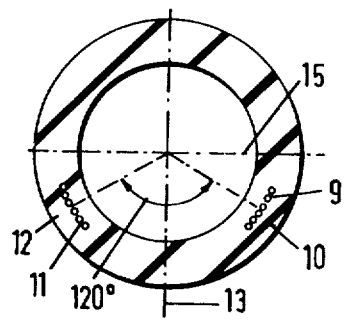
FIG. 3 shows a cross-sectional view of such a hose.

FIG. 3 shows in cross-section longitudinal reinforcing threads 9 in a wall zone 10 and longitudinal reinforcing threads 11 in a wall zone 12. Zones 10 and 12 are located with threads 9 and 11, respectively, symmetrically relative to diameter 13 perpedicular to the central pump shaft 14, and at substantially equal distances from diameter 15 perpedicular to diameter 13 and parallel to central pump shaft 14 (also see FIG. 4).

The neutral surface of the bent hose coincides with zones 10 and 12, in which reinforcing threads 9 and 11, respectively, are embedded.

Figure 4:
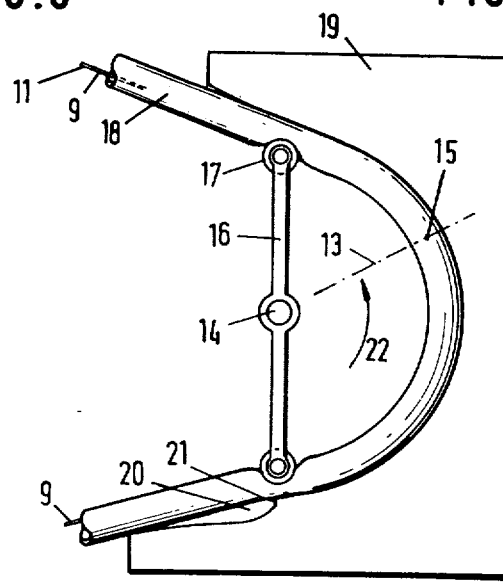
FIG. 4 is a diagrammatic elevation of a peristaltic pump according to the invention.

FIG. 4 is a diagrammatic showing of a peristaltic pump according to the invention. A rod 16 is secured to a drivable shaft 14 perpendicular to the plane of drawing. Mounted at each of the two ends of rod 16, at equal distances from shaft 14 is a rotatable roller 17. Rollers 17 provide for the transport of mortar in hose 18 by locally squeezing the hose shut, the latter being of the type shown in FIGS. 1, 2 and 3. A support track formed by a support member 19 is located concentrically relative to shaft 14 to provide counter-pressure when rollers 17 squeeze the hose.

At the run-on end there is provided a recess 20, owing to which the support track formed by support member 19 suddenly changes in diameter at 21, as a consequence of which rollers 17, rotating in the direction of arrow 22, when running on to the hose rapidly close the latter, thereby causing the approaching inner surfaces of the hose to enclose a large angle, which makes for more favourable possibilities of flow for the mortar with gravel and particles just in front of the rollers.

Figure 5:
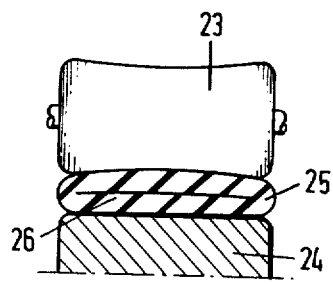
FIG. 5 is a cross-sectional view of a support track and a co-acting thrust roller of a pump according to the invention.

FIG. 5 shows a thrust roller 23 co-operating with a support member 24. The diameter of roller 23 gradually increases from the centre towards the ends thereof, so that the lateral longitudinal zones 25 of hose 26 are clamped against the cylindrical surface of member 24 by roller 23 somewhat earlier than is the central zone of hose 26. The change in diameter of roller 23 can be selected in conjunction with the thickness and elasticity of the hose wall so that the hose is simultaneously closed throughout its cross-section, or so that the zones 25 on the sides are closed slightly earlier, thereby forcing the mortar towards the central zone, which considerably reduces the chance of stones or other particles being clamped in the sharply bent lateral zones of the hose.

The embodiments of the invention in which an exclusive property of privilege is claimed, are defined as follows:

1. A peristaltic pump comprising a plurality of thrust rollers mounted for rotation and movable in a circular orbit around a central shaft, an arcuate support track concentrically around part of said orbit, and a hose of uniform thickness reinforced with threads of strong material, such as steel, said hose being arranged to be locally squeezed shut by said thrust rollers against said support track, characterized in that reinforcing threads extending in the longitudinal direction of the hose are embedded exclusively in two wall zones of said hose, said wall zones, as viewed in the cross-section of the hose, being located in a relatively small sector and symmetrically on opposite sides of a diameter perpendicular to said central shaft.

2. A pump according to claim 1, wherein the wall zones containing the longitudinally extending reinforcing threads are located on the same side of, and at equal distances from, a diameter parallel to said central shaft.

3. A pump according to claim 2, wherein the wall zones containing the longitudinally extending reinforcing threads are spaced apart a distance corresponding to approximately one third the circumference of the hose.

4. A pump according to claim 2, wherein the longitudinally extending reinforcing threads are located on the side of the diameter parallel to the central shaft, which faces said central shaft.

5. A pump according to claim 1 further characterized by layers of helically wound reinforcing threads in the wall of the hose, the threads of radially successive layers being wound at opposite angles of pitch, the threads extending in the longitudinal direction of the hose being located on the radially inward side of a layer of wound reinforcing thread.

6. A pump according to claim 5, wherein the longitudinally extending reinforcing threads are located between two layers of helically wound reinforcing threads.

7. A pump according to claim 1 wherein, as viewed in a cross-sectional plane containing the axis of said central shaft, the shortest distance between said support track and the circumference of the thrust rollers adjacent their axial ends is shorter than said distance adjacent the axial centre of said thrust rollers.

8. A pump according to claim 1 wherein a recess in the member forming said support track abruptly defines the effective beginning of the support track at a run-on end thereof.

* * * * *